(No Model.)
E. THOMSON.
METHOD OF MANUFACTURING SCREWS AND BOLTS BY ELECTRICITY.
No. 398,912. Patented Mar. 5, 1889.
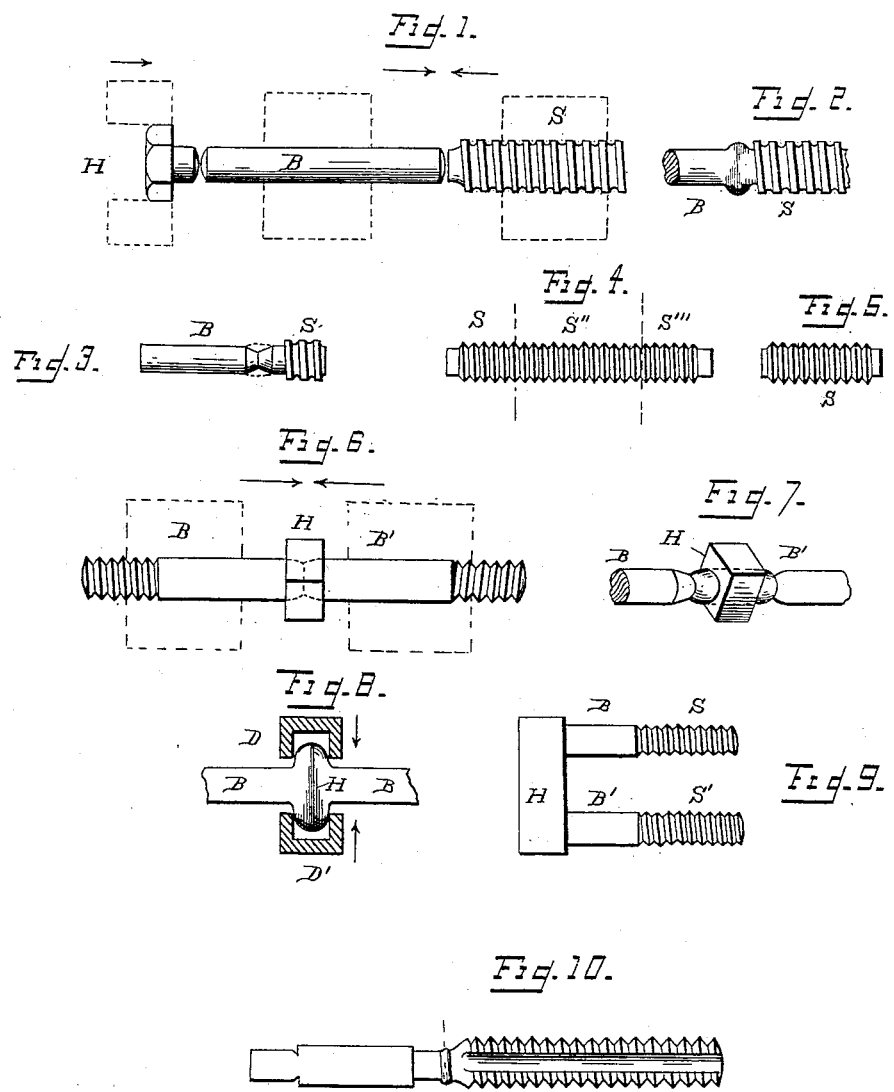
WITNESSES:
Ira R. Steward.
INVENTOR.
ELIHU THOMSON,
BY
Townsend & MacArthur
ATTORNEYS.

UNITED STATES PATENT OFFICE.

ELIHU THOMSON, OF LYNN, MASSACHUSETTS.

METHOD OF MANUFACTURING SCREWS AND BOLTS BY ELECTRICITY.

SPECIFICATION forming part of Letters Patent No. 398,912, dated March 5, 1889.

Application filed May 17, 1888. Serial No. 274,195. (No model.)

*To all whom it may concern:*

Be it known that I, ELIHU THOMSON, a citizen of the United States, and a resident of Lynn, in the county of Essex and State of Massachusetts, have invented a certain new and useful Method of Manufacturing Screws and Bolts, of which the following is a specification.

My invention relates to the manufacture of screws, screw-bolts, and screw-taps; and it consists, essentially, in forming the screw portion of the same and the shank or plain portion separately and then uniting the two by the electric welding process forming the subject of the prior patents granted to me and numbered 347,140, 347,141, and others.

My invention consists, further, in manufacturing screws and bolts by forming the screw and plain portions separately, joining the same by the electric welding process, and forming or adding a head or nut at any desired point in the length of the bolt, as will be hereinafter described. By this method of forming bolts the head or nut may be drop-forged separately, and the threaded portion may be made by cutting or rolling long lengths of threaded stock, which are cut up into pieces of desired length and welded to the plain pieces. It will also be evident that by adopting this method of manufacture the plain and screw portions of the two may be of any desired relative diameter, or that the plain portion may be of the same gage as the screw portion at the bottom of the threads or grooves in the latter. This is an evident advantage over the ordinary methods of manufacture, since in those cases where the thread is formed on the end of a plain blank the strength of the threaded portion becomes less than that of the shank. It will also be seen that by my method of manufacture the thread portion may be conveniently made of steel of one grade and the shank or body portion of iron or a lower grade of steel. It will also be apparent that the head may be of a different grade of stock from the rest of the bolt, tap, or screw.

In the accompanying drawings, Figure 1 illustrates my method of forming a bolt. Fig. 2 shows the appearance of the threaded and shank portions of the bolt at the point of union. Fig. 3 illustrates the preferred shape given to the shank and thread portions at their abutting portion preparatory to the union of the same by electric welding. Fig. 4 shows a length of screw-threaded stock adapted to be subdivided into separate portions, $S$ $S^2$ $S^3$, while Fig. 5 shows a single detached screw portion of the bolt. Fig. 6 illustrates one method of procedure when a head or nut is to be formed between two bars or screws. Fig. 7 illustrates another way of forming an intermediate head or nut. Fig. 8 shows another way of producing a head or nut on a plain bar. Fig. 9 illustrates another form of screw-bolt to the manufacture of which my invention may be applied. Fig. 10 illustrates a screw-tap manufactured in accordance with my invention.

Referring to Fig. 1, B indicates the plain or shank portion of the bolt, and S the screw-threaded portion of the same, which, having been formed separately, are placed with their ends abutting in suitable conducting-clamps, such as are described in my prior patents. An electric current of sufficient volume having been caused to pass across the abutting ends, so as to heat the same to the welding temperature, the shank and screw portions are pressed together, thus forming a weld, such as indicated in Fig. 2, and producing, by the attachment of a proper head or nut, a finished bolt. The abutting ends of the shank and screw are preferably tapered, as indicated in Fig. 3, preparatory to the welding operation, in order to avoid as far as may be the formation of a burr or enlargement at the weld. The head H may be formed separately by drop-forging, and may in like manner be welded or attached to the shank B by the process just described. The screw and shank portions may be formed separately by any desired process.

Fig. 4 illustrates a long bar made as a screw-thread and adapted to be cut up into separate sections for use separately in the construction of a finished bolt after the manner just described.

A right and left hand screw-bolt with an intermediate nut or head may be formed, as indicated in Fig. 6, by placing the two bolts in suitable conducting-clamps and pressing them against an intermediate nut, H, formed, if desired, with sockets to receive the bolt, when a sufficient heat has been developed at the point of union by the passage of an electric current, as described in my prior patents. By this process a bolt, such as is commonly used for a tightener or take-up between two parts of a structure, may be readily constructed. The part H forms the head for the application of a wrench. The head or nut H may be separately formed in any desired way.

In Fig. 7 the nut H is indicated as a drop-forging, formed at each side with projections or studs, with which the separate bars B B' may be pressed into contact, so as to be welded thereto after the manner of my prior patents. The head of nut H may be formed otherwise—as, for instance, by the process indicated in Fig. 8, which process forms the subject of a prior application for patent filed by me February 6, 1888, Serial No. 263,153, as a division of an application, Serial No. 202,842, filed May 21, 1886. In this process the bar is heated at the part H by an electric current passed through the bar, and the nut or head is formed by the means of suitable dies, D D', applied to the heated portion, in conjunction with end-pressure applied to the bar, for the purpose of causing the same to swell or bulge at the point H. By my invention, also, a set of yoked bolts such as indicated in Fig. 9 may be conveniently constructed, the yoke portion being indicated at H. The part H B B' may be formed separately by any desired process, and the two screw portions afterward united thereto by the electric welding process described.

Fig. 10 illustrates a screw-tap made in accordance with my invention. The grooved and threaded tap portion may be formed from blanks or lengths of any desired extent cut up into suitable lengths for forming separate taps or dies.

It is evident that by adopting my method of forming screws, bolts, or taps the necessity of special machinery for producing different sizes, forms, or lengths is avoided, and that the parts may be shipped separately to any point and there made up, as required, for any purpose by the use of the welding process described in my prior patents, Nos. 347,140, 347,141, 347,142, and others.

What I claim as my invention is—

1. The herein-described method of manufacturing screws, screw bolts and taps, consisting in forming the screw and plain or shank portions separately, bringing the same into contact, passing a current of large heating effect across the joint, and then uniting the pieces by end-pressure applied while they are heated by the electric current.

2. The herein-described method of manufacturing screws and screw bolts or taps, consisting in forming threaded stock in any desired lengths, subdividing the same as desired, and attaching the parts to shanks or plain portions by end-pressure applied while the joint is heated by an electric current passed across the joint, as and for the purpose described.

3. The herein-described improvement in manufacturing screws or screw-bolts, which consists in forming the head or nut separately, abutting the head and bolt proper, passing a heavy heating electric current across the joint to heat the head and bolt to welding temperature, and subjecting the two to endwise pressure in the direction of the end of the bolt, as and for the purpose described.

4. The herein-described method of manufacturing bolts and screws, consisting in forming the screw and shank portions separately, uniting the same by the electric welding process described, and then forming or adding the head or nut at any desired point, as and for the purpose described.

Signed at Lynn, in the county of Essex and State of Massachusetts, this 14th day of May, A. D. 1888.

ELIHU THOMSON.

Witnesses:
J. W. GIBBONEY,
J. E. RANDALL.